United States Patent [19]
Hsu et al.

[11] Patent Number: 5,973,029
[45] Date of Patent: Oct. 26, 1999

[54] CORROSION-RESISTANT WATERBORNE PAINTS

[75] Inventors: Shui-Jen R. Hsu, North Olmsted; Chia-Tien Chen, Brecksville, both of Ohio

[73] Assignee: The Sherwin-Williams Company, Cleveland, Ohio

[21] Appl. No.: 08/134,778

[22] Filed: Oct. 12, 1993

[51] Int. Cl.$^6$ .............................. C08L 41/00; C08L 81/08
[52] U.S. Cl. ...................... 523/201; 524/547; 524/745; 524/817; 525/902
[58] Field of Search .................. 106/14.43; 523/201; 524/547, 745, 817; 525/902

[56] References Cited

U.S. PATENT DOCUMENTS

| | | | |
|---|---|---|---|
| 3,586,519 | 6/1971 | Hendricks | 106/14 |
| 4,049,596 | 9/1977 | Traister et al. | 260/18 |
| 4,108,811 | 8/1978 | Eckhoff | 260/22 |
| 4,173,665 | 11/1979 | Nida | 427/421 |
| 4,217,260 | 8/1980 | Daniel et al. | 523/201 |
| 4,226,747 | 10/1980 | Roncari | 523/201 |
| 4,243,416 | 1/1981 | Grourke et al. | 106/14.13 |
| 4,243,417 | 1/1981 | Grourke et al. | 106/14.13 |
| 4,485,224 | 11/1984 | Smith | 526/214 |
| 4,617,359 | 10/1986 | Smith | 526/93 |
| 4,649,170 | 3/1987 | Reid | 524/247 |
| 4,812,510 | 3/1989 | Barnett et al. | 524/817 |
| 4,968,741 | 11/1990 | Burroway et al. | 524/710 |
| 4,999,250 | 3/1991 | Richardson et al. | 428/457 |
| 5,028,489 | 7/1991 | Kissel | 428/469 |
| 5,082,895 | 1/1992 | Wolff et al. | 524/820 |
| 5,100,931 | 3/1992 | Moradi-Araghi | 524/555 |
| 5,244,728 | 9/1993 | Bowman et al. | 428/330 |
| 5,264,471 | 11/1993 | Chmelir | 524/56 |

OTHER PUBLICATIONS

Robert D. Athey, Corrosion–Inhibitive Water–Borne Coatings, Jan. 1991.
Lubrizol, Amps Monomer, 1988, pp. 1–13.
Dow, Increasing Mechanical Stability and Reactor Yields with Dowfax Anionic Surfactants for Emulsion Polymerization Applications, pp. 1–12.

*Primary Examiner*—Peter A. Szekely
*Attorney, Agent, or Firm*—Robert E. McDonald; Heidi A. Boehlefeld; Vivian Y. Tsang

[57] ABSTRACT

Corrosion-resistant latex coatings comprising a diphenyl sulfonate surfactant and a salt of 2-acrylamido-2-methylpropane sulfonic acid.

4 Claims, No Drawings

CORROSION-RESISTANT WATERBORNE PAINTS

BACKGROUND OF THE INVENTION

This invention relates to improved corrosion-resistant waterborne paints. It further relates to the latex polymers and surfactant combinations which are useful in preparing such paints.

Previously, attempts to create waterborne corrosion-resistant latex paints have concentrated generally on the incorporation of specific corrosion-inhibiting ingredients into the binder system or the selection of particular binder components designed to maximize corrosion resistance. For example, U.S. Pat. Nos. 4,243,416 and 4,243,417 teach latex paints containing a water soluble complex of a polyvalent transition metal, a volatile complexing agent and a corrosion inhibiting anion. U.S. Pat. No. 3,586,519 teaches the use of a mixture of di-basic ammonium citrate and a neutralized acidic phosphate co-ester of an aliphatic alcohol and a non-ionic adduct of ethylene oxide and an organic compound containing reactive hydrogen atoms. U.S. Pat. No. 4,049,596 teaches the use of zinc borate and barium metaborate pigments to provide corrosion resistance. U.S. Pat. No. 4,108,811 teaches the use of a blend of resins along with a corrosion-inhibiting pigment or pigments. U.S. Pat. No. 4,173,665 teaches the use of polychloroprene polymer latexes and corrosion inhibitors to provide corrosion protection. U.S. Pat. No. 4,649,170 teaches elastic, breathable underbody coatings containing corrosion inhibiting agents. U.S. Pat. No. 4,999,250 teaches the use of a salt of a metal (magnesium, calcium, barium or zinc) of a hydroxycarboxylic acid which can be added to either a paint, oil or grease to improve corrosion resistance when use on metal surfaces. U.S. Pat. No. 5,028,489 teaches adding a sol or gel containing salt to a polymeric coating to improve the corrosion-inhibiting properties of the coating. U.S. Pat. No. 4,968,741 teaches latexes made with phosphate surfactants and vinyl aromatic monomers to achieve corrosion-inhibitive waterborne coatings. U.S. Pat. No. 5,082,895 teaches the use of high levels of styrene and large particle size to create higher solids waterborne coatings having corrosion resistance. U.S. Pat. No. 4,812,510 teaches the use of sodium 2-acrylamido-2-methylpropane sulfonate to make stable small particle size latexes.

SUMMARY OF THE INVENTION

The present invention comprises the utilization of two particular ingredients in the preparation of a waterborne coating binder. The use of these two ingredients creates a coating which exhibits excellent corrosion resistance.

First, among other ingredients, the binder comprises a salt of 2-acrylamido-2-methylpropane sulfonic acid (otherwise known as AMPS) as a comonomer. Second, the emulsifier used during the preparation of the binder is a surfactant selected from the diphenyl sulfonate family.

The binder is preferably a latex prepared by free radical emulsion polymerization. Most preferably, the binder is a core/shell type latex having a softer core and a harder shell. The use of the above-described comonomer and surfactant enables the paint formulator to prepare paints which exhibit excellent corrosion resistance with, or without, additional corrosion inhibitors or corrosion inhibiting pigments.

Accordingly, it is an object of the present invention to teach waterborne coatings having excellent corrosion resistance.

It is an additional object of the present invention to teach the use of particular components in the preparation of latexes which produce waterborne coatings having excellent corrosion resistance.

It is a further object of the present invention to teach the use of core/shell polymers in combination with particular components to produce waterborne coatings having excellent corrosion resistance.

These and other objects will become more apparent from the detailed description which follows below.

DETAILED DESCRIPTION OF THE INVENTION

Critical to the preparation of the latex of this invention is the use of a surfactant which is a diphenyl sulfonate, preferably an alkylated diphenyloxide disulfonate having a formula as represented by Figure I:

Figure I:

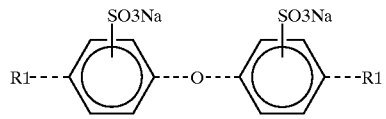

wherein R1 is a hydrocarbon backbone.

Alkylated diphenyloxide disulfonates meeting this criteria are commercially available from The Dow Chemical Company under the Tradename DOWFAX. One particularly preferred DOWFAX surfactant is the dodecyl diphenyloxide disulfonate known as DOWFAX 2A0.

This surfactant is generally included in the monomer reaction mixture in an amount of between about 0.50 to about 3.5% by weight of surfactant solids based upon total monomer weight, preferably in an amount of between about 0.8% and about 2.0% by weight.

In general, the paint composition comprises a latex binder. The term latex is well known in the paints and coatings field to mean a two phase system wherein there exists a first continuous phase which comprises water, water soluble additives such as emulsifiers and the like and water soluble or compatible solvents. There also exists a second discontinuous or dispersed phase which is dispersed in the first phase. This second phase comprises polymeric particles and other ingredients which, when applied to a substrate and allowed to dry, form the basis for the continuous coating film.

Latexes of particular concern to the present invention are those which comprise polymers derived from acrylic and other monomers such as, for example, alkyl or aryl esters of unsaturated carboxylic acids including acrylates and methacrylates such as ethyl acrylate, 2-ethylhexyl acrylate, methyl methacrylate, phenylacrylate and the like.

The use of butyl acrylate is discouraged in the present invention except in very small percentages due to a noticable decrease in resistance to humidity of resulting paint compositions.

In addition, acrylic copolymers derived from the above acrylic monomers and other monomers such as, for example, aliphatic and aromatic monomers such as ethylene, butadiene, styrene and vinyl toluene, vinyl halides such as vinyl chloride, vinyl bromide, and vinylidene chloride, unsaturated nitriles such as acrylonitrile and methacrylonitrile, unsaturated amides such as acrylamide, N-substituted acrylamide, and methacrylamide, unsaturated carboxylic acids such as acrylic acid, methacrylic acid and maleic acid or anhydride, and fumaric acid, and other polymerizable monomers of various types may be utilized.

Some hydroxy-functional monomers such as hydroxy ethyl acrylate and methacrylate can be included although such monomers are not preferred and should not be included in large quantities.

Acrylonitrile is to be used only in the core portion of core/shell polymers due to the preference to avoid free acrylonitrile monomer in the final polymer. Also, if using acrylonitrile as a monomer, it is preferred to maintain the percentage of acrylonitrile below about 22.5% by weight (based upon total monomer weight) because of a perceived decrease in corrosion resistance of paints containing percentages of acrylonitrile above this amount. Preferably, the percentage of acrylonitrile should be no greater than about 17.5% by weight of total monomers.

When formulating with the acrylic acids, it is preferred to maintain the percentage of acids in the shell portion of core/shell polymers below about 3% by weight of total shell monomers and to maintain the percentage of total acids in both the core and the shell below about 4.5% by weight of total monomers due to the tendency for the polymer to exhibit water sensitivity if amounts greater than this are present.

One monomer which is critical to the success of the present invention is the use of a calcium, sodium, magnesium, potassium, zinc, or ammonium salt of 2-acrylamido-2-methylpropane sulfonic acid (AMPS). The AMPS monomer lends stability to the latex paints. It also enables formulating with less grit. The AMPS monomer is generally present in an amount of between about 0.5% to about 5.0% by weight (based upon total monomer weight), preferably in an amount of less than about 3.0% by weight. It is preferably included in both the core and the shell of core/shell polymers.

The latex polymers of this invention are prepared by free-radical initiated emulsion polymerization techniques which are well known in the industry. As stated above, however, the present invention requires the presence of two critical ingredients, a diphenyl sulfonate surfactant and the AMPS comonomer.

The use of a core/shell polymerization technique results in unique advantages. In particular, the resultant polymer can be formulated to have a harder shell and a softer core. This results in a polymer which is flexible yet durable. Preferably, the monomers should be selected so as to formulate a core portion of the polymer having a calculated Tg of less than about 30 degrees C. and a shell portion of the polymer having a calculated Tg of greater than about 50 degrees C. Example I shows the preparation of a typical core/shell polymer according to this invention.

EXAMPLE I

Prepare separate solutions as follows:

| Core Monomers | | Shell Monomers | | AMPS Solution | | Initiator | |
|---|---|---|---|---|---|---|---|
| Styrene | 168 g | MMA | 56 g | Water | 150 g | Water | 100 g |
| 2-EHA | 290 | Styrene | 42 | AMPS | 8.4 | APS | 2 |
| ACN | 105 | IBMA | 154 | Ammonium | 2.9 | | |
| MAA | 17.6 | MAA | 7.5 | | | | | where 2-EHA is 2-ethylhexyl acrylate, ACN is acrylonitrile, MAA is methacrylic acid, MMA is methyl methacrylate, IBMA is isobutyl methacrylate, AMPS is 2-acrylamido-2-methylpropane sulfonic acid, Ammonium is 28% aqueous solution, and APS is ammonium persulfate In a 3000 ml flask, charge 32 g of dodecyl diphenyloxide disulfonic acid, 3.87 g of aqueous ammonium, and 850 g of deionized water. Heat to 84 degrees C. under nitrogen purge. Remove the nitrogen purge and add a mixture of 0.7 g of sodium bicarbonate and 0.5 g of ammonium persulfate in water. Add 56 g of the core monomers and 10 g of the AMPS solution. After 20 minutes, three feeds are started: (i) the remainder of the core monomers over a period of 1 hr 45 min, (ii) all but 40 ml of the AMPS solution over a period of 1 hr 35 min, and (iii) the initiator solution over a period of 3 hr 35 min. Maintain the reaction temperature at 84 degrees C. for 45 minutes after the completion of the core monomer addition. Then, concurrently add the shell monomers over a 45 min period and the remaining 40 ml of AMPS solution over a 40 min period. Hold the entire reaction vessel at 84 degrees C. for 1 hr after the completion of the initiator feed. Add a solution of 0.2 g tert-butyl hydroperoxide in 3 g deionized water. Wait two minutes and add a solution of 0.2 g sodium formaldehyde sulfoxylate in 3 g deionized water. Repeat these last two additions after ten minutes wait. Cool the latex to 30 degrees C. Neutralize with 7.5 g of aqueous ammonium and filter through a 75 micron cloth.

The coatings of this invention can also include other conventional paint ingredients to improve their performance. For example, solvents such as glycols can be added to the paints at concentrations up to about 35% by weight to act as coalescing solvents Conventional additives such as surfactants, microbiocides, defoamers, flow agents and the like can be added as is well known in the coatings art. Normally, the coating composition will contain pigmentation. Typical coating pigments include titanium dioxide, clays, zinc oxide, carbon black, mica, silicas, calcium carbonate, phthalocyanine blue and green pigments, chrome yellow pigments and the like. Additionally, additives and pigments which are known to contribute corrosion resistance can be included.

One preferred procedure for formulating paints according to this invention is shown in Example II:

EXAMPLE II

Grind the following ingredients in a high speed disperser at approximately 2500 rpm speed for approximately 20 minutes:

| | |
|---|---|
| Texanol (Carbon Ester Alcohol) | 10.0 lbs |
| Ethylene Glycol | 13.5 |
| Butyl Carbitol (diethylene glycol monobutyl ether) | 14.5 |
| QR-681M (Dispersant-Rohm & Haas) | 7.5 |
| Igepal CO-897 (Surfactant-Rhone-Poulenc) | 0.9 |
| Triton CF-10 (Surfactant-Rohm&Haas) | 0.5 |
| Aq. Ammonia | 0.96 |
| Drewplus L-405 (Defoamer-Ashland) | 0.75 |
| Tipure R-902 Titanium Dioxide | 178.0 |
| Water | 45.5 |

Thoroughly mix 624.0 lbs of the Latex of Example I with 2.0 lbs of aq. ammonia and 4.0 lbs of Drewplus L-475 and add to the grind at about 1000 rpm speed. Letdown the grind with the following ingredients:

| | |
|---|---|
| Water | 32.4 lbs |
| Aq. Ammonia | 5.0 |
| Water**** | 9.1 |
| Sodium nitrite**** | 2.0 |
| Acrysol RM1020 (Thickener-Rohm & Haas) | 4.5 |
| Texanol | 29.0 |

-continued

| | |
|---|---|
| Dapro W77 (Surfactant-Daniels Prod) | 2.0 |
| Acrysol EXP 300 (Thickener) | 2.2 |
| Butyl Carbitol | 3.0 |

****Premixed
Mix for 15 minutes.

What is claimed is:

1. A corrosion resistant latex composition comprising an emulsion in water of a core/shell polymer prepared by free radical emulsion polymerization techniques wherein one of the monomers utilized in the production of the polymer comprises the ammonium salt of 2-acrylamido-2-methylpropane sulfonic acid and wherein the free radical polymerization is conducted in the presence of a diphenyl sulfonate surfactant.

2. The latex of claim 1 wherein the diphenyl sulfonate surfactant is an alkylated diphenyloxide disulfonate.

3. A coating composition comprising a waterborne latex binder and at least one pigment wherein the latex binder is a core/shell polymer prepared by free radical emulsion polymerization techniques and wherein one of the monomers utilized in the production of the polymer comprises the ammonium salt of 2-acrylamido-2-methylpropane sulfonic acid and wherein the free radical polymerization is conducted in the presence of a diphenyl sulfonate surfactant.

4. The coating of claim 3 wherein the diphenyl sulfonate surfactant is an alkylated diphenyloxide disulfonate.

* * * * *